May 6, 1958 G. W. REPKOW 2,833,880
STOP LIGHT CONTROL ARRANGEMENT
Filed July 18, 1955 2 Sheets-Sheet 1
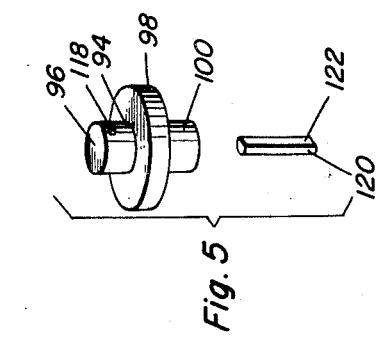
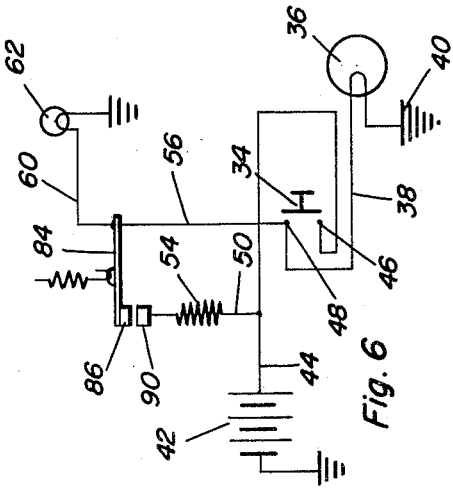
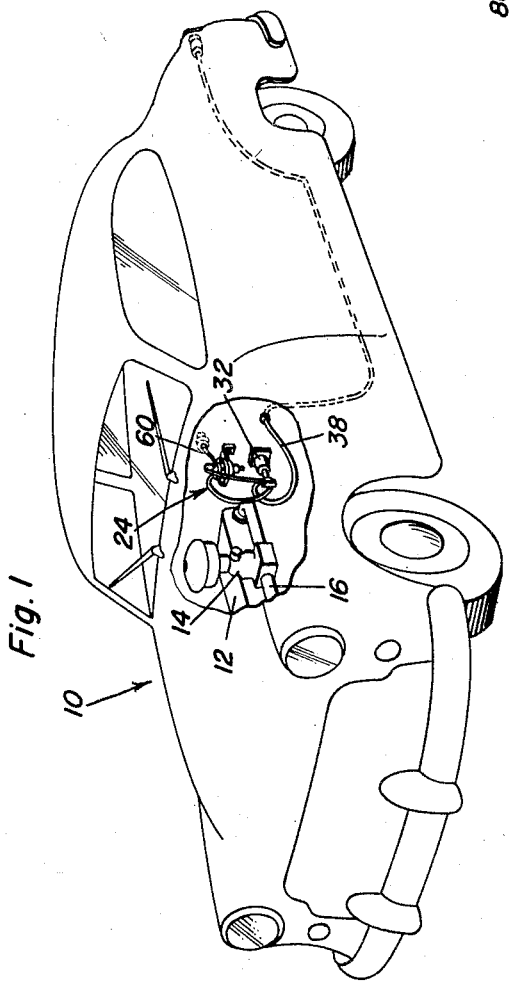
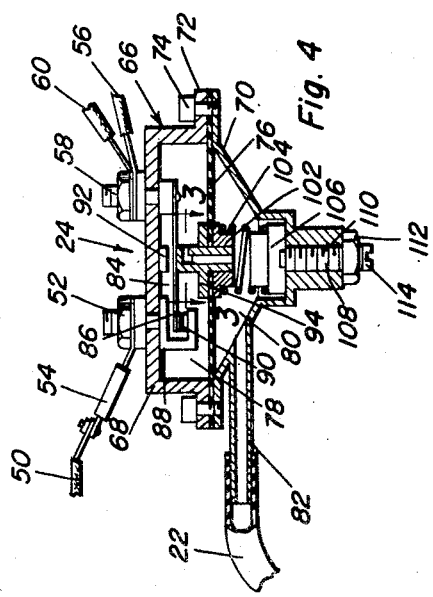
George W. Repkow
INVENTOR.

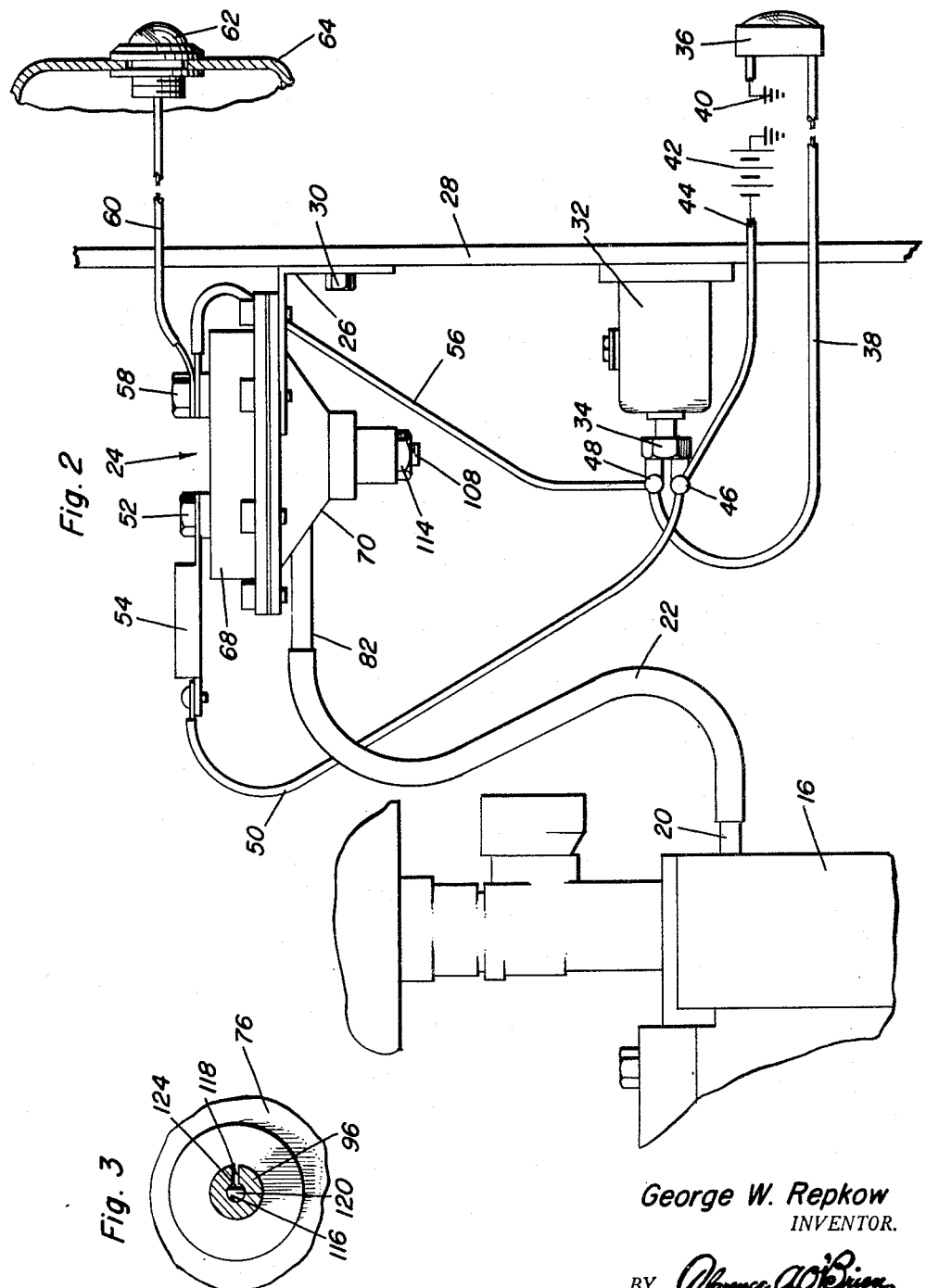

United States Patent Office 2,833,880
Patented May 6, 1958

2,833,880
STOP LIGHT CONTROL ARRANGEMENT

George W. Repkow, Waukegan, Ill.

Application July 18, 1955, Serial No. 522,697

3 Claims. (Cl. 200—83)

This invention generally relates to a safety device for attachment to a motor vehicle and more particularly to a stop light control arrangement for use in actuating the stop light of a motor vehicle upon release of the accelerator pedal controlling the throttle linkage on the internal combustion engine of the vehicle thereby giving operators of similar types of vehicles approaching the rear of a vehicle forewarning of the deceleration of the motor vehicle thereby permitting the operator of the following vehicle to react accordingly.

The principal object of the present invention resides in the provision of an automatically operated device which will provide additional forewarning to a motorist following a vehicle in which the invention is installed so that upon release of the accelerator pedal, the stop light of the vehicle will be actuated to thus provide an additional warning time so that the following vehicle may be more safely operated wherein the device is actuated in response to the closing of the throttle valve of a carburetor on an internal combustion engine thereby causing the vacuum in the intake manifold of such an engine to increase for actuating the warning device.

The construction of this invention specifically features the utilization of a vacuum actuated switch connected to a point in the intake manifold of an internal combustion engine adjacent the butterfly throttle valve wherein the vacuum in the intake manifold will be increased when the butterfly valve is moved to a closed position wherein the switch will be actuated for actuating the warning device. Specifically, the vacuum switch includes in its construction a bleeding orifice which permits the switch to be in closed position for actuating the stop light of the vehicle a predetermined amount of time wherein this time is directly proportional to the vacuum in the intake manifold of the engine.

Other important objects of the present invention reside in the provision of a stop light control system that is simple in construction, capable of being installed on various automotive vehicles, adapted to provide a following motorist with a forewarning of reduction in speed of the leading vehicle, adapted to provide a flash warning wherein the warning device will be actuated for predetermined length of time depending upon the speed of the vehicle and the vacuum in the intake manifold of the internal combustion engine, and which is relatively inexpensive to manufacture thereby permitting the device to be produced and sold at a reasonable price.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a diagrammatic view illustratiing the manner in which the device of the present invention is operatively installed in a motor vehicle;

Figure 2 is an enlarged schematic illustration of the various component elements of the invention and showing the relationship of the vacuum operated switch, the master cylinder switch and the lights associated therewith;

Figure 3 is a sectional view taken substantially upon a plane passing along section line 3—3 of Figure 4 illustrating the details of the metering or bleeding orifice;

Figure 4 is a longitudinal, vertical sectional view taken substantially upon a plane passing along the longitudinal center line of the vacuum switch utilized in the control arrangement;

Figure 5 is a group perspective view illustrating the construction of the flat-sided plug in the orifice thereby forming a metering orifice; and Figure 6 is a wiring diagram of the various component electrical elements of the invention.

With reference to the accompanying drawings, numeral 10 generally designates an automotive vehicle of any particular type having an internal combustion engine 12 installed therein. The engine 12 is provided with a conventional carburetor 14 mounted on an intake manifold 16 wherein the carburetor 14 has installed therein a butterfly throttle valve (not shown) of conventional design for controlled passage of the air and fuel mixture into the engine. This butterfly valve is controlled by a throttle linkage actuated by the accelerator pedal of the vehicle by the operator of the vehicle for controlling the speed and acceleration of the vehicle.

The intake manifold 16 is provided with a fitting 20 having a flexible tube 22 attached thereto. The conduit 20 may be any of the conventional conduits communicating with the intake manifold 16 such as the vacuum line to the windshield wipers, spark advance mechanism or the vacuum booster of the conventional fuel pump for driving the windshield wipers. Any type of fitting may be utilized and may be connected to any of the above-mentioned vacuum lines or to any other line available as long as it is communicated with the interior of the intake manifold 16.

The particular concept of this invention resides in connecting the intake manifold to a stop light control system in a manner so that when the butterfly throttle valve is substantially closed with the motor running such as occurs during deceleration, the vacuum in the manifold will be at its greatest and the stop light control system will be actuated for illuminating the stop light thereby warning following drivers that the vehicle is decelerating so that they may properly control their vehicle.

The vacuum line 22 is connected to a vacuum actuated switch generally designated by the numeral 24 which is mounted upon a right angular bracket 26 secured to the firewall 28 by fastening means 30. The bracket 26 is disposed above the master cylinder 32 also mounted forwardly on the firewall 28 wherein the master cylinder 32 is provided with the usual stop light switch 34 on the end thereof for actuating the stop light 36 at the rear of the vehicle through suitable electrical conductors 38 which interconnect the switch 34 and the stop light 36 so that when pressure is applied to the brakes by depression of the brake pedal, the stop light 36 will be illuminated in the usual manner. The stop light 36 is grounded as indicated by the numeral 40 for completing the circuit to the battery 42. A supply conductor 44 is connected to one terminal 46 of the switch 34 and the conductor 38 is connected to the other terminal 48 of the switch 34 wherein the conductor 38 is electrically connected to the stop light 36 and the conductor 44 is connected to the battery 42 for supplying energy to the stop light 36 selectively upon depression of the brake pedal of the vehicle.

Connected to the terminal 46 of the stop light switch 34 is an electrical conductor 50 connected to a terminal 52 on the vacuum switch 24 wherein a resistor 54 is inserted in the conductor 50 for a purpose described hereinafter. An electrical conductor 56 interconnects the other terminal 48 on the switch 34 to a terminal 58 on the vacuum actuated switch 24 wherein the stop light switch 34 will be by-passed and the stop light 36 will be illuminated when the vacuum actuated switch 24 is actuated thereby electrically connecting the conductors 50 and 56. The resistor 54 reduces the electrical energy supplied to the stop light 36 when the switch 24 is in closed position wherein the stop light will be illuminated with a reduced brilliance in relation to the brilliance of the stop light 36 when the brake pedal is depressed. This will permit following motorist to determine if the foot is removed from the accelerator pedal or whether the foot is being placed on the brake pedal to permit the following motorist to act accordingly.

An electrical conductor 60 is connected to the terminal 58 at one end and at the other end is connected to a small light 62 mounted on the dashboard 64 wherein the light 62 is grounded on the dashboard 64 for forming a warning signal light on the dashboard 64 so that the operator of the vehicle may determine if the safety control device of the present invention is operating properly.

Referring now specifically to Figure 4 of the official drawings, the vacuum actuated switch 24 includes a casing generally designated by the numeral 66 including an upper hollow portion 68 and a lower hollow portion 70 that are each provided with projecting horizontal peripheral flanges 72 secured together by fastening bolts 74. A flexible diaphragm 76 extends completely across the internal area of the casing 66 and is secured between the flanges 72 by the fastening bolts 74 in air tight relation thereby dividing the interior of the casing 66 into an upper area 78 and a lower area 80. The lower area 80 is provided with a projecting pipe fitting 82 which is connected to the flexible tube 22 thereby communicating the intake manifold 16 with the lower area 80 in the casing 66.

Within the interior of the upper half 68 of the casing 66, the terminal 58 is provided with a generally horizontally disposed flat spring 84 which is in the nature of a breaker arm having an electrical contact point 86 on the free end thereof. Mounted on a bracket 88 and electrically connected to the terminal 52 is an electrical contact point 90 in alignment with the contact point 86 for electrical connection therewith, thereby forming a pair of breaker points for selectively closing the circuit between the electrical conductors 50 and 56. A bumper or stop member 92 is provided centrally in the path of movement of the breaker arm 84 for limiting the upward movement thereof to prevent excessive deflection and deformation of the breaker arm 84. When the diaphragm 76 is in normal position with equal pressure on the top and bottom thereof, the breaker arm 84 is maintained in a position with the contact point 86 spaced from the contact point 90 by a centrally disposed retainer 94 secured centrally on the diaphragm 76 which is provided with an upstanding projecting surface 96 for contacting the undersurface of the breaker arm 84 for raising the breaker arm 84 to move the contact point 86 away from the contact point 90.

The retainer 94 has a peripheral flange 98 for engaging the upper surface of the diaphragm 76 and a depending cylindrical portion 100 extending through the diaphragm 76 and receiving an annular member 102 that is provided with a peripheral recess for receiving one end of a coil compression spring 104. The other end of the coil compression spring 104 is seated on a generally annular member 106 having a peripheral recess engaging telescopically into the spring 104 for forming a guide and end for the spring 104. An adjustment screw 108 extends screwthreadedly through a bore 110 in the bottom half 70 of the casing 66 and the screw 108 is provided with an inner end in abutting engagement with the spring seat 106 for movement thereof thereby adjusting the tension of the compression spring 107. The screw 108 is provided with a lock nut 112 for locking the screw 108 in adjusted position together with a slot 114 in the outer end thereof for engagement by a suitable tool, such as a screw-driver.

The cylindrical portion 100 of the retainer 94 together with the upstanding portion is provided with a vertical bore 116 extending from the bottom thereof to a point adjacent the top surface 96. The lateral bore 118 extends outwardly from the vertical bore 116 and is in communication with the upper area 78 within the casing 66. This bore 118 is of reduced cross sectional area in relation to the bore 116. The bore 116 is in communication with the lower area 80 of the casing 66 thereby providing intercommunication between the lower area and the upper area 78 within the casing 66. Positioned in the bore 116 is a cylindrical plug 120 having a flat side 122 thereby providing a relatively small passageway 124 upwardly from the bottom of the bore 116 along the side thereof to the transverse passageway 118. This arrangement provides a metering orifice or bleed orifice to permit intercommunication between the upper area 78 and the lower area 80 within the housing 66.

When vacuum is induced in the line 22, the force of the vacuum will pull the diaphragm 76 downwardly against the compression spring 104 thereby permitting breaker arm 84 to move down for contacting the points 86 and 90 for closing the electrical circuit and illuminating the stop light 36. The passageways 124 and 118 permits the vacuum in the lower section 80 to create a vacuum in the upper section 78 thereby equalizing the pressures or vacuums on each side of the diaphragm 76 wherein the spring 104 will again urge the retainer 94 upwardly thereby urging the breaker arm 84 upwardly for dis-contacting the points 86 and 90 for breaking the circuit and causing the stop light 36 to be deenergized. If the difference in vacuum between the lower section 80 and the upper section 78 in the casing 66 is relatively great, a relatively longer time will elapse before the switch which has been closed will be opened thereby permitting the light 36 to be illuminated for a relatively longer period of time. Therefore, the vacuum switch 24 is actuated in response to the vacuum in the intake manifold 16 for illuminating the stop light 36 and is responsive to the scope of the vacuum for determining the length of time of illumination of the light 36.

When the vehicle 10 is accelerated, the vacuum in the manifold drops to substantially zero inasmuch as the butterfly valve is substantially open. After the car has obtained speed and the accelerator pedal is moved upwardly and the throttle valve to a closed position, the vacuum in the manifold will rise to a maximum of approximately 24 inches of mercury. Assuming that the car is travelling at a relatively high rate of speed and the foot is removed from the accelerator pedal, the vacuum will rise to its greatest amount thereby causing immediate illumination of the stop light 36 until such time as the metering orifice permits the vacuum to be equalized on both sides of the diaphragm at which time the spring causes the contact points to break for deenergizing the light. This neutralizing effect of the metering orifice may take from one second at 10 miles per hour to approximately 8 seconds at 70 miles per hour. The purpose of this orifice is to allow the diaphragm to neutralize itself causing the light to remain on only a few seconds after deceleration. This neutralizing effect takes place regardless of the speed and the rate of deceleration wherein the normal action of the stop light will not be effected thereby forming an effective pre-warning to following motorist that the lead vehicle is decelerating.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vacuum operated switch comprising a casing, a diaphragm secured in said casing and dividing the same into lower and upper chambers, one of said chambers being communicated to a source of vacuum, a stationary contact in the other of said chambers, a movable contact in the other of said chambers, said contacts being mounted on said casing with the movable contact being biased toward said stationary contact, said contacts adapted to be electrically connected to a circuit for selectively completing and breaking the circuit, a retainer mounted on said diaphragm with one end thereof forming an abutment for engagement with the movable contact and moving the same away from the stationary contact, a spring in said one chamber for urging the diaphragm and retainer towards the other chamber for normally holding the movable contact away from the stationary contact whereby vacuum introduced in the one chamber will move the retainer away from the movable contact thereby permitting engagement of the contacts for completing the circuit, said retainer being hollow for communicating the chambers for equalizing the pressures therein, and means in the hollow retainer for restricting the flow of air therebetween whereby the equalization of the pressures in the chambers will require a length of time determined by the differential in pressure in the chambers.

2. The combination of claim 1 wherein said restricting means includes a flat-sided generally cylindrical plug disposed in the hollow retainer and forming a partial closure therefor, said retainer having a lateral passageway inwardly of the abutment for communicating the chambers with the end of the retainer forming the abutment.

3. The combination of claim 2 together with means to finely adjust the tension of said spring thereby adjusting the pressure exerted on the diaphragm for determining the neutral position thereof.

References Cited in the file of this patent

UNITED STATES PATENTS

| | | |
|---|---|---|
| 1,118,188 | Desmond | Nov. 24, 1914 |
| 1,859,598 | North | May 24, 1932 |
| 1,925,762 | Johnson et al. | Sept. 5, 1933 |
| 2,250,133 | Pearce | July 22, 1941 |
| 2,296,667 | Hemphill | Sept. 22, 1942 |
| 2,602,143 | Bolles | July 1, 1952 |
| 2,685,650 | Collins et al. | Aug. 3, 1954 |
| 2,702,840 | Jackson et al. | Feb. 22, 1955 |